United States Patent [19]

Riml

[11] Patent Number: 4,690,231

[45] Date of Patent: Sep. 1, 1987

[54] TRACKLAYING UNDERCARRIAGE FOR BULLDOZER, CRAWLER LOADERS OR OTHER TRACKLAYING VEHICLES

[75] Inventor: Peter Riml, Mieming, Austria

[73] Assignee: Liebherr-Werk Telfs GES. m.b.H., Telfs, Austria

[21] Appl. No.: 832,999

[22] Filed: Feb. 26, 1986

[30] Foreign Application Priority Data

Feb. 26, 1985 [DE] Fed. Rep. of Germany ....... 3506774
Feb. 3, 1986 [DE] Fed. Rep. of Germany ....... 3603261

[51] Int. Cl.$^4$ ............................................ B62D 55/00
[52] U.S. Cl. .................................. 180/6.48; 180/9.44; 180/9.5; 267/273; 403/225
[58] Field of Search ............... 180/9, 9.1, 9.5, 9.52, 180/9.58, 9.6, 9.62, 9.64, 6.2, 6.48; 305/35 R, 35 E, 35 B; 403/220, 221, 225; 267/63 A, 63 R, 57.1 A, 57.1 R, 153 R

[56] References Cited

U.S. PATENT DOCUMENTS

| 2,684,845 | 7/1954 | Maton | 267/57.1 A |
|---|---|---|---|
| 3,006,627 | 10/1961 | Paulsen | 267/57.1 A |
| 3,225,849 | 12/1965 | Casse | 180/9.5 |
| 3,297,339 | 1/1967 | Hendrickson | 403/225 |
| 3,974,891 | 8/1976 | Persson | 180/9.5 |
| 3,980,149 | 9/1976 | Blomstrom | 180/9.5 |
| 4,364,443 | 12/1982 | Sato | 180/9.5 |
| 4,483,406 | 11/1984 | Smith | 180/9.5 |
| 4,519,465 | 5/1985 | Triplett | 180/6.2 |

FOREIGN PATENT DOCUMENTS

| 604009 | 9/1934 | Fed. Rep. of Germany | 180/9.5 |
|---|---|---|---|
| 2433962 | 8/1976 | Fed. Rep. of Germany | 180/9.5 |
| 206320 | 6/1970 | U.S.S.R. | 180/9.5 |

Primary Examiner—John J. Love
Assistant Examiner—Everett G. Diederiks, Jr.
Attorney, Agent, or Firm—Fleit, Jacobson, Cohn & Price

[57] ABSTRACT

A tracklaying undercarriage for bulldozers, crawler loaders or other tracklaying vehicles including a central main frame and two tracklaying frames disposed on opposite sides of the main frame. The tracklaying frames are mounted at one end on mutually aligned supporting axles, which are fixed to the main frame, and at the other end on a rocker bridge, which is pivoted at its center to the main frame. The undercarriage also includes track chains, which are trained around driving and reversing chain sprockets mounted at mutually opposite ends of the tracklaying frames, and rotary hydraulic motors for driving the driving chain sprockets. The motors are supplied with fluid by hydraulic pumps, which are driven by an internal combustion engine mounted on the main frame. The tracklaying frames are mounted on the supporting axles by means of elastic bearings, which have outer and inner races that are interconnected by elastic material.

5 Claims, 6 Drawing Figures

TRACKLAYING UNDERCARRIAGE FOR BULLDOZER, CRAWLER LOADERS OR OTHER TRACKLAYING VEHICLES

BACKGROUND OF THE INVENTION

1. Field of the Invention

This invention relates to a tracklaying undercarriage for bulldozers, crawler loaders or other tracklaying vehicles, and more particularly to a tracklaying undercarriage that includes bearings that absorb noise and impacts and that do not require frequent servicing.

2. Description of the Prior Art

In known tracklaying undercarriages, the bearings of the tracklaying frames must be frequently serviced because the bearings transmit to the main frame, and via the latter to the driver's cab, the impacts which are applied to the chains, and also the noise which is caused by such impacts.

It is an object of the invention to provide a tracklaying undercarriage in which the tracklaying frames are connected to the main frame by bearings which do not need frequent servicing and which will absorb impacts and noise.

3. Summary of the Invention

Briefly stated, in accordance with one aspect of the present invention, tracklaying frames are mounted on supporting axles by means of elastic bearings, which have outer and inner races that are interconnected by elastic material. The use of elastic bearings in accordance with the invention affords the additional advantage that the bearings will allow for inaccuracies which are due to manufacture. The undercarriage includes a central main frame, two tracklaying frames disposed on opposite sides of the main frame and mounted at one end on mutually aligned supporting axles, which are fixed to the main frame, and at the other end on a rocker bridge, which is pivoted at its center in the main frame. The apparatus also includes track chains, which are trained around driving and reversing chain sprockets mounted at mutually opposite ends of the tracklaying frames, and rotary hydraulic motors for driving the driving chain sprockets, which motors are supplied with fluid by hydraulic pumps driven by an internal combustion engine mounted on the main frame.

Owing to the pivotal movements of the rocker bridge, the tracklaying frames perform small angular movements about vertical axes. Such movements will also be taken up by the elastic bearings, which include outer and inner races that are interconnected by elastic material.

In an embodiment of the invention, the elastic bearings are in the form of spherical bearings, which include spherical inner races and split spherical outer races, which are interconnected by vulcanization-bonded rubber interlayers. Such spherical bearings are known, they need not be serviced, and they have a high load-carrying capacity in the radial and axial directions. The rubber interlayer, which is disposed between and vulcanization-bonded to the spherical inner race and the split spherical outer race, will have a high load-carrying capacity when the outer races have been axially stressed. The outer race is capable of an elastic rotation relative to the inner race about radial and axial axes and during such rotation will impart shear forces to the rubber interlayer.

In an embodiment of the tracklaying underframe in accordance with the invention, the hydraulic motors for driving the driving chain sprockets are mounted on the tracklaying frames so that impact, vibration and noise will not be transmitted from the tracklaying frames to the main frame via the drive means.

The mounting of the hydraulic motors and the associated gear trains on the tracklaying frames affords the additional advantage that the drive means and the gear trains will not be loaded by the weight of the main frame, that the geometry of the chain-guiding means will not be loaded by the weight of the main frame, and that the geometry of the chain-guiding means will not be altered when the tracklaying frames have been swung to a position in which there is a bend in a chain because the driving chain sprocket is rotatably mounted on a sprocket shaft, which is disposed beside the supporting axle and mounted on a gear shaft connected to the main frame.

DESCRIPTION OF THE PREFERRED EMBODIMENT

Figure 1:
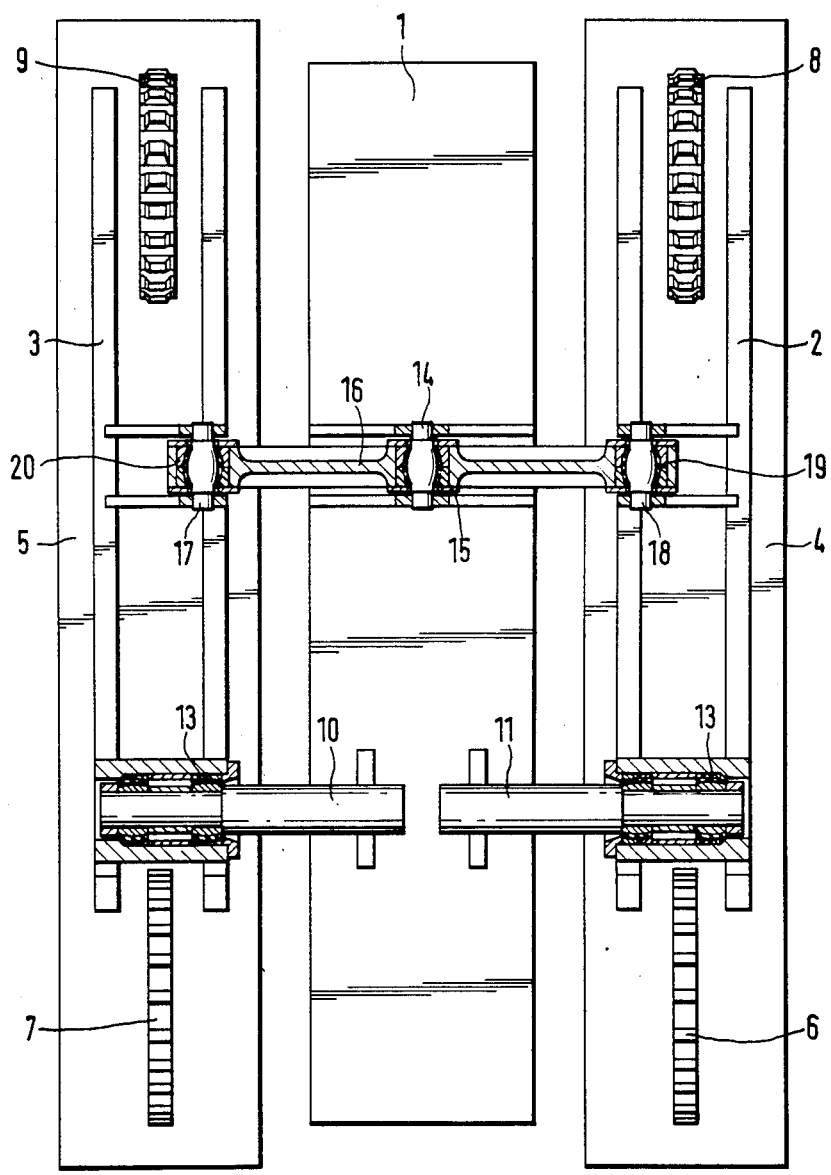
FIG. 1 is a diagrammatic top plan view showing a tracklaying undercarriage in accordance with the present invention.

Referring now to the drawings, and particularly to FIG. 1 thereof, a diesel engine (not shown) or other power source is mounted on a main frame 1 and by a transmission means (not shown) drives hydraulic pumps that can be positioned on tracklaying frames 2 and 3. Tracklaying frames 2, 3 are provided with track chains 4, 5 and are disposed on opposite sides of the main frame 1. The chains 4, 5 are trained around driving chain sprockets 6, 7 and reversing chain sprockets 8, 9, which are rotatably mounted in respective end portions of the tracklaying frames 2, 3.

Two supporting axles 10, 11 are secured to the main frame 1 and are aligned with each other. The tracklaying frames 2, 3 are pivoted to the supporting axles by means of spherical bearings 13.

A rocker bridge 16 is mounted by means of a spherical bearing 15 on the central pivot 14, which extends in the longitudinal direction of the main frame 1 and is spaced forwardly of the supporting axles 10, 11. The tracklaying frames 2, 3 are provided with pivots 17, 18, which are parallel to the central pivot 14 and on which the ends of the rocker bridge 16 are mounted by means of spherical bearings 19, 20.

Figure 2:
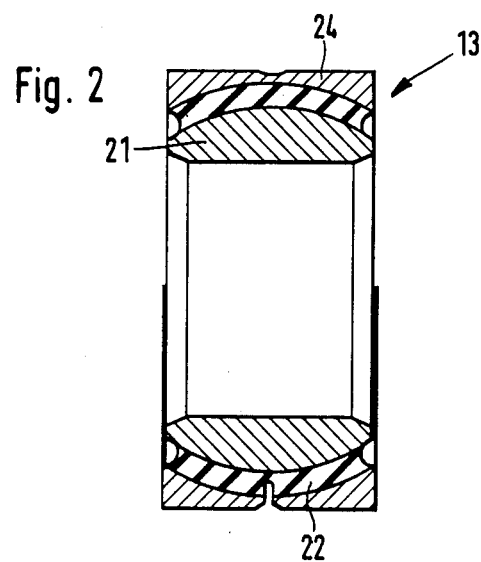
FIG. 2 is a cross-sectional view showing one of the spherical bearings mounted on the supporting axle of the undercarriage shown in FIG. 1.
Figure 3:
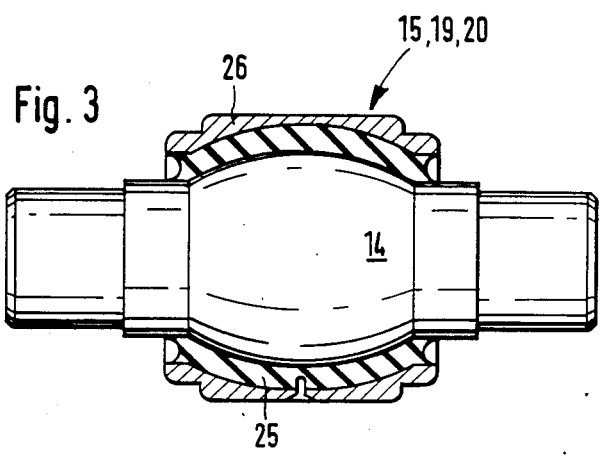
FIG. 3 is a cross-sectional view showing one of the three bearings of the rocker bridge of the undercarriage shown in FIG. 1.

Details of the design of the spherical bearings 13 and 15, 19, 20 are shown in and are apparent from FIGS. 2 and 3. The spherical bearing 13 comprises an inner race 21 having a spherically curved outer surface, a split outer race 24, which has a spherical inner surface that is complementary to the outer surface of the inner race 21, and a rubber interlayer 22, which is disposed between and vulcanization-bonded to the inner and outer races 21 and 24.

In the spherial bearings 15, 19, 20, the pivots 14, 17, 18 are provided with spherically curved intermediate portions, which are connected to the split outer race 26 by a rubber interlayer 25, which is vulcanization-bonded to the intermediate portions of the pivot and to the outer race 26. The outer race 26 of bearing 15 is similar to the outer race 24 of bearing 13.

Figure 4:
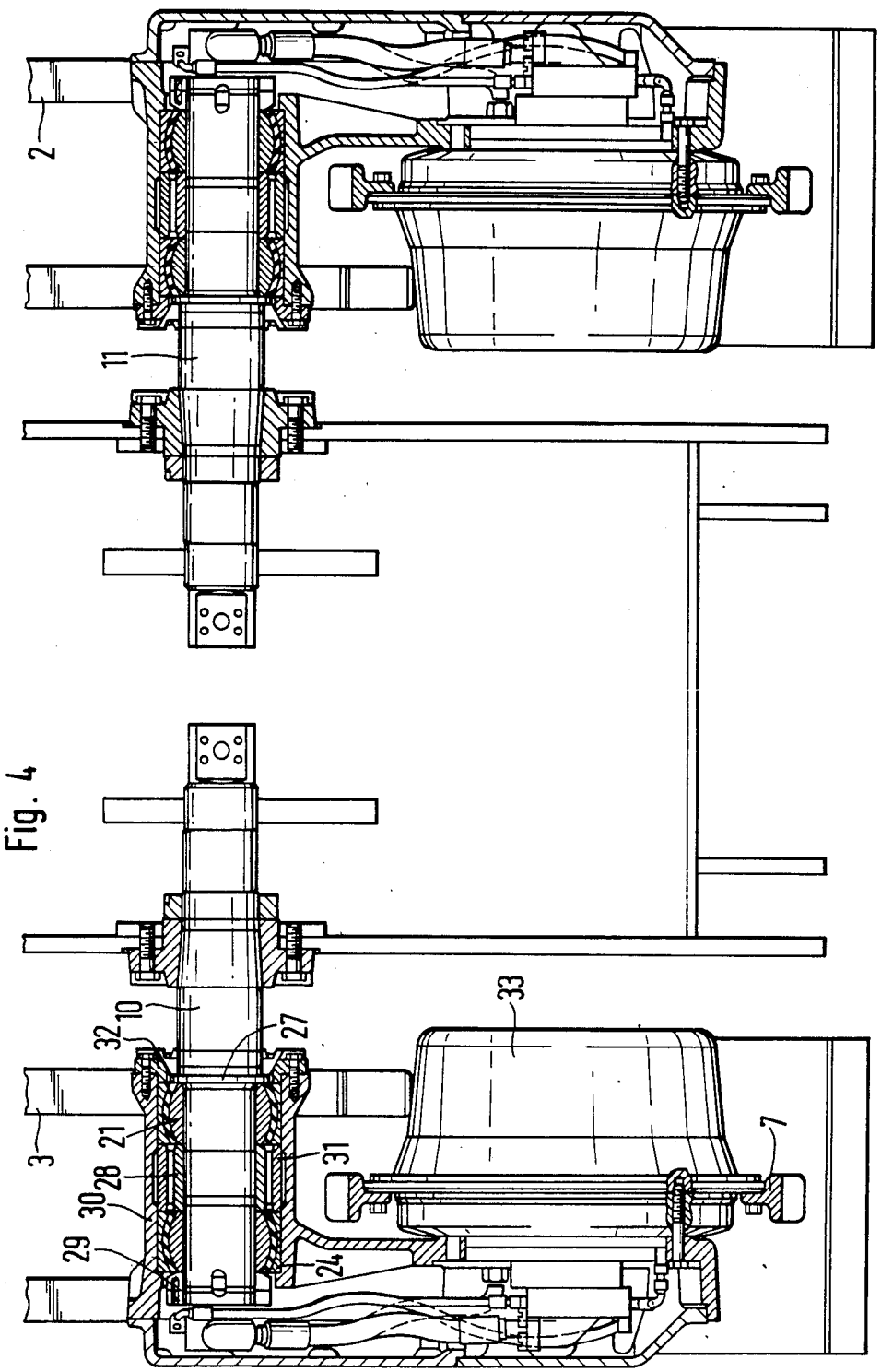
FIG. 4 is an enlarged cross-sectional view showing the bearings for the supporting axles shown in FIG. 1.

As is apparent from FIG. 4, each of the axles 10, 11 has a collar 27, which supports the inner race 21 of the associated inner spherical bearing 13. A spacer sleeve 28 is mounted on each axle between the inner races 21 of the two spherical bearings 13 mounted on the axle. By that spacer sleeve 28 and by a nut 29, which has been screwed on the outer end of the axle, the inner races of the spherical bearings 13 are non-rotatably held on the axles 10, 11.

The outer race 24 of each spherical bearing 13 is fixed in a cylindrical bore of a bearing housing 30, which is secured to each tracklaying frame 2 or 3. The outer races 24 of the outer spherical bearings 13 bear on shoulders 30a, which are formed in the cylindrical bore of the housing 30. A spacer sleeve 31 is disposed between the outer races 24. By means of spacer sleeve 31 and of the flange 32, which is screwed to the housing 30 by bolts 32a, the outer races 24 are forced against opposite ends of spacer sleeve 31 and are non-rotatably secured to the housing 30. The drive arrangement for the driving chain sprocket 7 is carried in the drive housing 33, which is connected to bearing housing 30, and which includes a rotary hydraulic motor, a planetary gear train and a brake. An example of a suitable drive arrangement that can be used in the present invention is described in Published German Application No. 30 45 226, the disclosure of which is hereby incorporated herein by reference the same as if fully set out herein. The supply and return lines for the hydraulic fluid extend through the supporting axles 10, 11 as is shown in FIG. 4.

Figure 5:
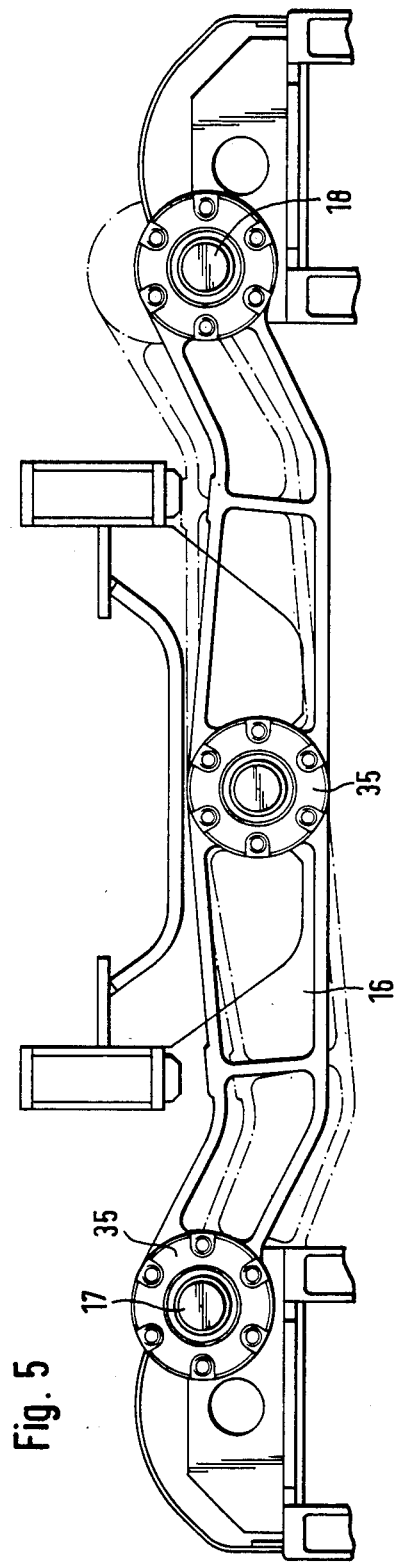
FIG. 5 is a side elevation of the rocker bridge of the undercarriage shown in FIG. 1.
Figure 6:
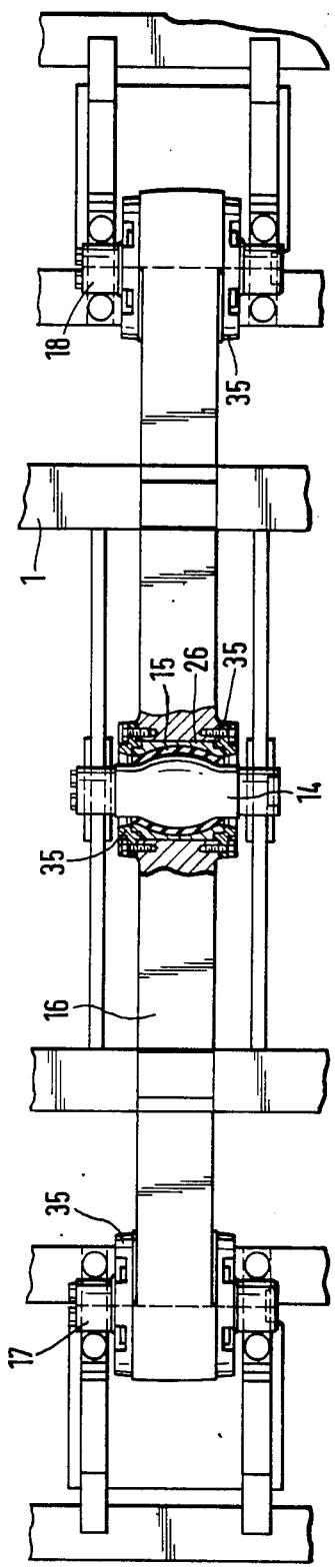
FIG. 6 is a top view, partially in section, of the rocker bridge of FIG. 5.

As shown in FIGS. 5 and 6, the rocker bridge 16 is pivoted on the pivot 14, which is centrally disposed in and secured to the main frame 1. The inner race of the spherical bearing 15 is constituted by the pivot 14. The outer race 26 of the spherical bearing 15 is slidably received in a central bore 16a of the rocker bridge 16 and is retained in the central bore by screw-connected flanges 35 secured to rocker bridge 16 at opposite ends of bore 16a.

The respective outer end portions of the rocker bridge 16 are provided with bores 17a, 18a, respectively, in which the spherical bearings 19, 20 associated with and formed on the pivots 17, 18 are fixed by screw-connected flanges 35 disposed at oppostie ends of the bores. The outer, cylindrical end portions of the pivots 17, 18 are secured to and carried by the tracklaying frames 3, 2, respectively. Preferably, the pivots 14, 17, and 18 of the rocker bridge 16 and the associated spherical bearings 15, 19, 20 are identical in design.

If the spherical bearings are provided as taught by the invention they need not be serviced. Any impact loads which might otherwise be transmitted to the main frame and to the remainder of the vehicle will be significantly reduced. As the spherical bearings result in effective damping of vibratory loads, the transmission of noise from the tracklaying frames to the main frame will also be reduced. Identical tracklaying frames can be used for bulldozers and crawler loaders even if they have different track widths.

It is to be understood that the details of the invention can be varied in many ways, and the invention is not restricted to the details and characteristics shown and discussed in the example of its embodiment.

What is claimed is:

1. A tracklaying undercarriage for bulldozers, crawler loaders or other tracklaying vehicles, comprising:
    (a) an elongated centrally positioned main frame;
    (b) two tracklaying frames disposed on opposite sides of the main frame and both having a pair of spaced ends, said tracklaying frames each supported at one end on one of a pair of aligned supporting axles which extend transversely of and are fixed to the main frame and extend from the main frame to the respective tracklaying frame, said tracklaying frames supported at the other end on a rocker bridge that lies forward of the supporting axles, extends transversely of and is pivotally mounted at its center to the main frame on a pivot extending in the longitudinal direction of the main frame;
    (c) driving and reversing chain sprockets mounted at mutually opposite ends of the tracklaying frames;
    (d) track chains that pass around respective pairs of said driving and reversing chain sprockets;
    (e) driviing means for driving the driving chain sprockets;
    (f) two juxtaposed spherical bearings for carrying each tracklaying frame on its respective supporting axle, said bearings having outer races non-rotatably connected to the tracklaying frames and inner races non-rotatably connected to the supporting axles, said outer and inner races interconnected by elastic material disposed therebetween; and
    (g) said tracklaying frames being carried on the rocker bridge on elastic bearing means having outer races non-rotatably connected to the tracklaying frames and inner races non-rotatably connected to the rocker bridge, said outer and inner races interconnected by elastic material disposed therebetween.

2. A tracklaying undercarriage according to claim 1, wherein the spherical bearings have spherical inner races and split spherical outer races, and the inner and outer races are separated and interconnected by vulcanization-bonded rubber interlayers disposed therebetween.

3. A tracklaying undercarriage according to claim 1, wherein th elastic bearing means between the tracklaying frames and the rocker bridge are spherical bearings having spherical inner races which include integral, outwardly extending aligned pivots.

4. A tracklaying undercarriage according to claim 1, wherein the elastic bearing means between the tracklaying frames and the rocker bridge are spherical bearings having spherical inner and outer races.

5. A tracklaying undercarriage according to claim 1, wherein the driving means for driving each track chain are mounted in the tracklaying frame associated with that chain.

* * * * *